United States Patent [19]

Fejer et al.

[11] Patent Number: 4,880,297

[45] Date of Patent: Nov. 14, 1989

[54] QUANTUM WELL OPTICAL ELECTRIC FIELD BIASED NONLINEAR METHOD AND APPARATUS

[75] Inventors: Martin M. Fejer, Menlo Park; Robert L. Byer, Stanford, both of Calif.

[73] Assignee: Board of Trustees of Leland Stanford, Jr. University, Stanford, Calif.

[21] Appl. No.: 109,054

[22] Filed: Oct. 15, 1987

[51] Int. Cl.$^4$ ............................................. G02F 1/015
[52] U.S. Cl. ...................................... 350/355; 350/356
[58] Field of Search ............... 350/355, 356, 353, 354; 372/21, 22; 357/4

[56] References Cited

U.S. PATENT DOCUMENTS

| | | | |
|---|---|---|---|
| 3,758,194 | 9/1973 | Daval et al. | 350/356 |
| 4,518,934 | 5/1985 | Venkatesan | 307/425 X |
| 4,696,533 | 9/1987 | Kingston et al. | 350/96.14 |

OTHER PUBLICATIONS

Wood et al., "High-Speed Optical Modulation with GaAs/GaAlAs Quantum Wells in a p-i-n Diode Structure", Appl. Phys. Lett. 44(1), Jan. 1, 1984, pp. 16-18.

*Primary Examiner*—Eugene R. LaRoche
*Assistant Examiner*—Nathan W. McCutcheon
*Attorney, Agent, or Firm*—Cushman, Darby & Cushman

[57] ABSTRACT

Optically transparent quantum well structures, such as GaAs/Al$_{0.5}$Ga$_{0.5}$As, are electrically biased to produce a quadratic nonlinear optical susceptibility, the sign of which depends on the direction of the applied electric bias field. This quadratic nonlinear optical susceptibility is particularly useful for enhancing three-wave interactions especially when the applied bias field is made spatially periodic to obtain quasiphasematched interaction. Also, the quantum well material is preferably arranged in an optical waveguide for guiding the interacting waves to reduce unwanted diffraction effects.

11 Claims, 2 Drawing Sheets

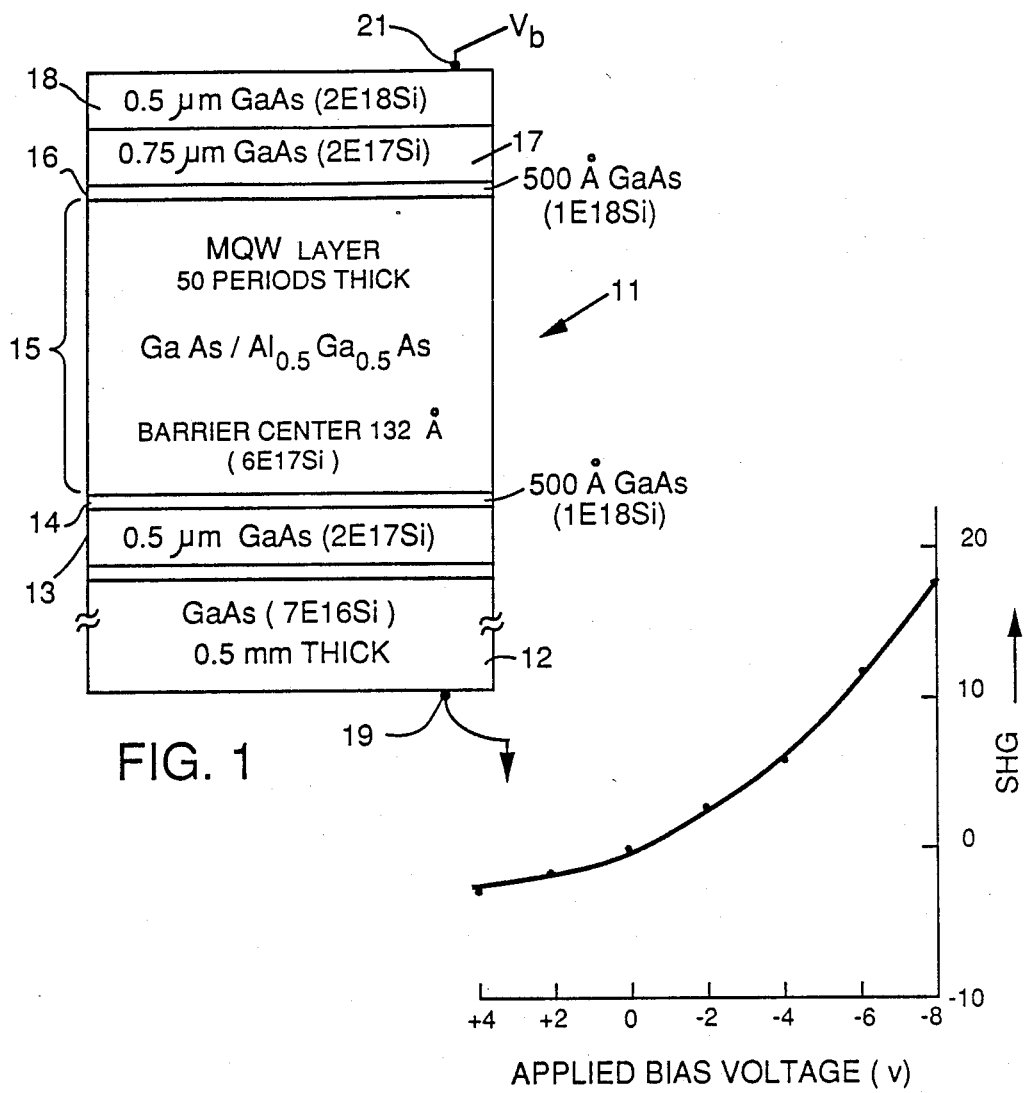
FIG. 1
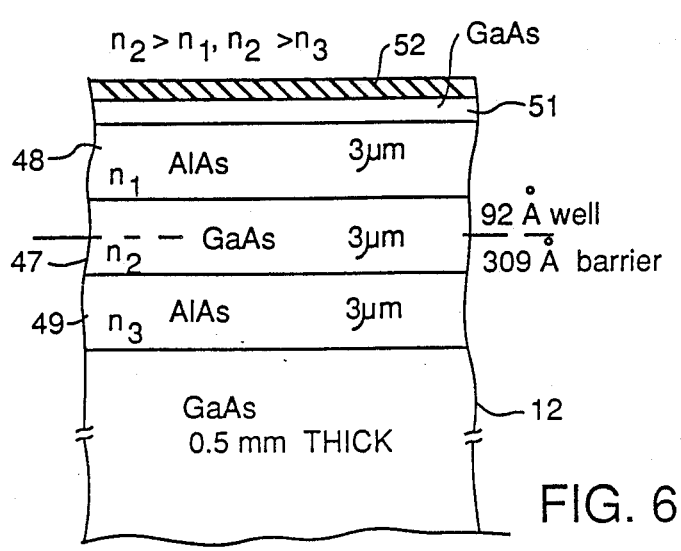
FIG. 3
FIG. 6

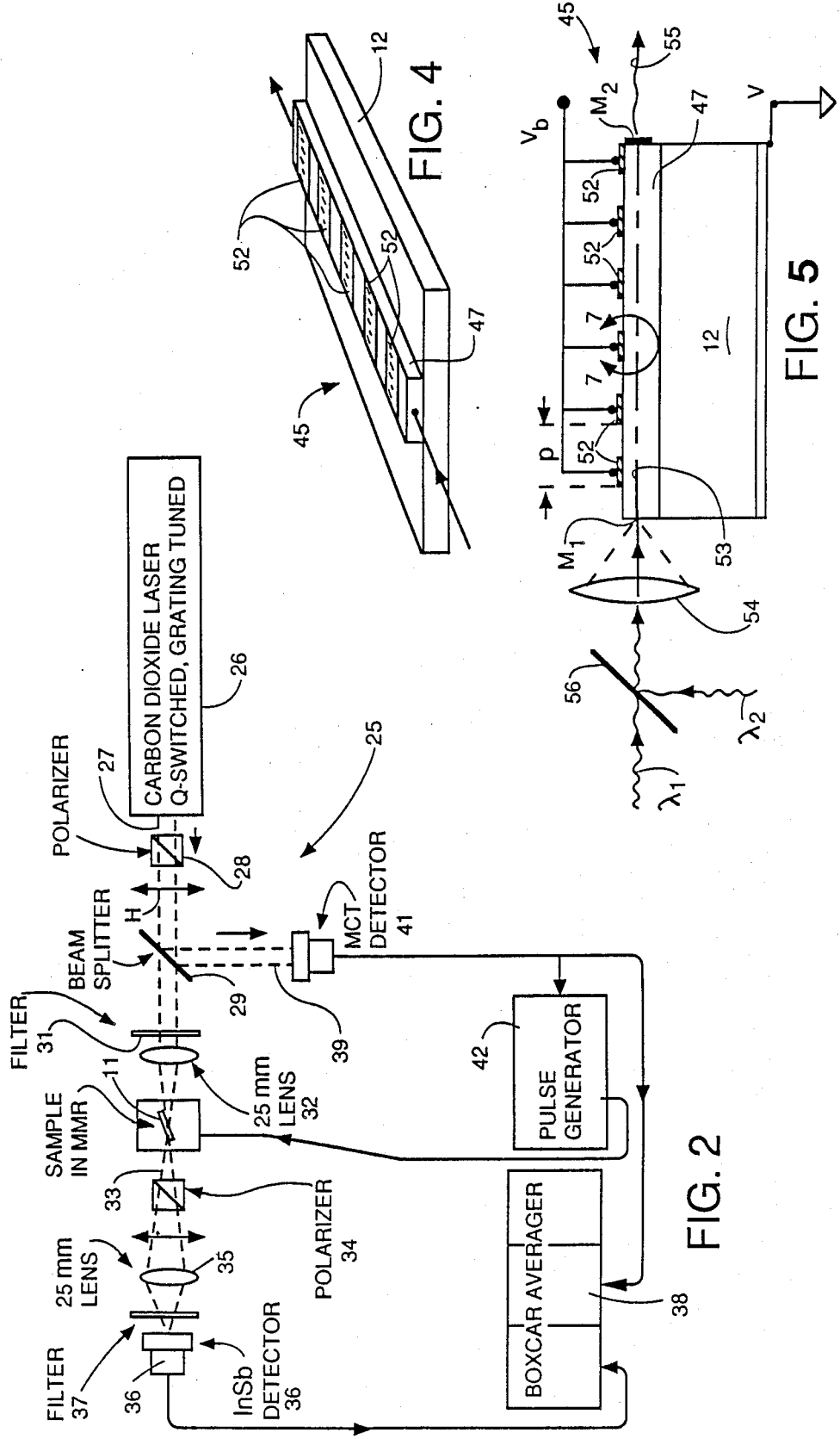

QUANTUM WELL OPTICAL ELECTRIC FIELD BIASED NONLINEAR METHOD AND APPARATUS

GOVERNMENT CONTRACT

The present invention was made in performance of a Government contract with the United States Air Force under Contract No. F49620-85-C-0062 and the Government has certain rights therein.

BACKGROUND OF THE INVENTION

The present invention relates in general to quantum well optical nonlinear devices and, more particularly, to such devices in which an applied bias electric field produces a quadratic nonlinear optical susceptibility suitable for enhancing optical three-wave interactions, such as, harmonic generation, sum or difference frequency generation and parametric amplification or oscillation.

DESCRIPTION OF THE PRIOR ART

Heretofore, it has been proposed that the large spatial extent of electron wavefunctions in quantum well structures (QWS) leads to a very efficient four-wave mixing processes (large third order nonlinearities) via the large dipole matrix elements of the intersubband transitions. Three-wave interactions (second order non-linearities) are forbidden by the inversion symmetry of simple square quantum wells. It has been proposed to circumvent this difficulty by compositionally grading the wells in an asymmetric fashion. The predicted second order susceptibilities for graded QWS are quite large, but cannot easily be phasematched in cubic semiconductors.

Such prior quantum well devices are disclosed in articles appearing in: Applied Physics Letters Vol 46, pg. 1156 (1985) and I.E.E.E. Journal of Quantum Electronics Vol. QE-19, pg. 791 (1983).

SUMMARY OF THE PRESENT INVENTION

The principal object of the present invention is the provision of an improved quantum well optically nonlinear device and, more particularly, to such a device which exhibits large quadratic nonlinear optical susceptibilities and which is capable of providing quasiphasematched operations for three-wave interactions.

In one feature of the present invention, an electric bias field is applied across the quantum well material to produce a substantial quadratic nonlinear optical susceptibility, the sign of which is determined by the direction of the applied bias field, whereby second order nonlinear optical interactions, including but not limited to, second harmonic generation, frequency summing and differencing, parametric amplification and oscillation are obtained.

In another feature of the present invention, three-wave optical interactions are enhanced by spatially periodically varying the intensity of the electric bias field applied across the quantum well material with the period selected to obtain quasiphasematched operation, whereby the efficiency of the three-wave interactions is enhanced.

In another feature of the present invention, the quantum well material is arranged relative to adjacent material of lesser index of refraction to define an optical waveguide containing the quantum well material for guiding the optical waves of interest, whereby the efficiency of the wave interactions is enhanced by reducing diffraction effects.

Other features and advantages of the present invention will become apparent upon a perusal of the following specification taken in connection with the accompanying drawings wherein:

BRIEF DESCRIPTION OF THE DRAWINGS

FIG. 1 is a schematic cross-sectional view of a quantum well structure of the present invention, FIG. 2 is a schematic diagram, partly in block diagram form, of a second harmonic generator incorporating features of the present invention, FIG. 3 is a plot of applied bias voltage vs. second harmonic output for the generator of FIG. 2, FIG. 4 is a perspective view of a quasiphasematched three-wave interaction quantum well device of the present invention, FIG. 5 is a schematic side-elevational view of the device of FIG. 4, and FIG. 6 is an enlarged detail view of a portion of the structure of FIG. 5 delineated by line 7—7.

DESCRIPTION OF THE PREFERRED EMBODIMENTS OF THE PRESENT INVENTION

Referring now to FIG. 1, there is shown, in cross-section, a quantum well structure 11 of the present invention. The structure 11 includes a semiconductor substrate having a plurality of semiconductive layers grown thereon. All layers, including the substrate, are optically transparent at the infrared wavelengths of interest, i.e., 5.5 to 10.7 $\mu$m.

Briefly, the substrate 12 is 0.5 mm thick single crystal GaAs doped with silicon to a concentration of $7 \times 10^{16}$ cm$^{-3}$. An epitaxial layer 13 of GaAs 0.5 $\mu$m thick doped with silicon to a concentration of $2 \times 10^{17}$ cm$^{-3}$ is grown on the substrate 12. An epitaxial layer 14 500 Å thick of GaAs doped with silicon to $1 \times 10^{18}$ cm$^{-3}$ is grown on layer 13.

A fifty period deep layer 15 of quantum well material is epitaxially grown on layer 14. Each period of the quantum well layer 15 includes alternate layers of barrier and quantum well material. Each barrier layer is 309 Å thick of Al$_{0.45}$Ga$_{0.55}$As material with a center portion 132 Å thick doped with silicon to a concentration of $6 \times 10^{17}$ cm$^{-3}$. Each quantum well layer portion is 92 Å thick of epitaxial GaAs.

A 500 Å thick epitaxial layer 16 of GaAs doped with silicon to a concentration of $1 \times 10^{18}$ cm$^{-3}$ is grown over the multiple quantum well (MQW) layer 15. A 0.75 $\mu$m epitaxial layer 17 of GaAs doped with silicon to a concentration of $2 \times 10^{17}$ cm$^{-3}$ is grown over layer 16. An electrode layer 18 0.5 $\mu$m thick of epitaxial GaAs doped with silicon to a concentration of $2 \times 10^{18}$ cm$^{-3}$ is grown over layer 16.

Electrical contacts 19 and 21 are made to layers 18 and substrate 12 to apply a bias voltage $V_b$ of 8 volts across the quantum well material 11 to produce an applied electric field normal to the quantum well layer portions of the multiple quantum well layers 15. The effect of the applied electric field is to produce an asymmetry in the potential well. This asymmetry introduces a substantial quadratic nonlinear optical susceptibility into the optical propagation characteristics of the quantum well layer portion.

The polarization density P is proportional to $\chi^{(2)}E^2 + \chi^{(3)}E^3$ where E is the amplitude of the optical electric field and $\chi^{(2)}$ and $\chi^{(3)}$ are coefficients of quadratic and third order nonlinear optical susceptibilities, respectively. $\chi^{(2)}$ is proportional to the amplitude of the applied electric field across the quantum well layer. Thus, it is seen that applying the bias electric field to the quantum well material introduces a substantial quadratic nonlinear optical susceptibility which is useful for obtaining optical three-wave interactions.

Referring now to FIG. 2, there is shown a second harmonic generator 25 incorporating features of the present invention. The second harmonic generator 25 includes a carbon dioxide laser source 26 of fundamental optical wave radiation in the range of wavelengths of 9.5 to 10.7 μm as input beam 27. The input beam 27 is horizontally polarized by polarizer 28 and thence fed through a beam splitter 29, band pass filter 31 (12 to 8 μm) and focused by focusing lens 32 onto the quantum well structure 11 disposed at Brewsters angle relative to the input beam 27.

The input beam 27 passes through the quantum well structure 11 from one major face to the opposed major face. The bias voltage $V_b$ is applied across the structure 11 to produce the desired quadratic nonlinear optical susceptibility for second harmonic generation. This is a three-wave interaction, i.e., $\omega_i = \omega_s + \omega_s$ where $\omega_i$ is the input frequency and $\omega_s$ is the second harmonic output frequency.

The second harmonic output, as beam 33, at $\omega_s$ is passed through a horizontal polarizer 34 and thence through focusing lens 35 and focused onto InSb optical detector 36. A highpass filter 37 (passes λ shorter than 5.5 μm) is disposed between the lens 35 and the detector 36 for filtering out fundamental wave energy.

The output of the optical detector 36 is fed to a boxcar averager 38 for averaging. The input beam 27 is pulsed with 1KW peak pulses of 200 ns duration with a pulse repetition rate of 100 Hz. The pulses are sampled by an output 39 from the beam-splitting mirror 29 which is detected by optical detector 41 and the detected output fed to the averager 38 for synchronizing the averager. A second output is fed to synchronize a pulse generator 42 for pulsing the bias voltage applied to the QWS 11 in synchronism with the pulses of the input beam 27.

Referring now to FIG. 3, there is shown a plot of the second harmonic output signal as a function of the bias voltage applied across the QWS 11.

Referring now to FIGS. 4, 5, and 6, there is shown an alternative three-wave interaction device 45 incorporating features of the present invention. The quantum well structure 45 of FIG. 4 is similar to that of FIG. 1 except that the quantum well layer 15 includes only one layer of quantum well material 92 Å thick sandwiched inbetween two barrier layers 309 Å thick each having a center layer 132 Å thick doped with silicon to a concentration of $1 \times 10^{16}$ cm$^{-3}$. The barrier layers are sandwiched between layers of GaAs to provide an optical waveguide layer 47 3 μm thick having an index of refraction $n_2$ greater than $n_1$ and $n_3$ of AlAs layers 48 and 49 each 3 μm thick and disposed on both sides of the waveguide layer 47.

These layers 47, 48 and 49 are epitaxially grown on the substrate 12. A thin cap 51 of GaAs is grown over the top layer 48 to passivate the layer 48 and an electrode structure 52 of heavily silicon-doped GaAs, i.e., $2 \times 10^{18}$ cm$^{-3}$, is grown and patterned over the optical waveguide 47.

The electrode structure 52 is patterned to produce a spatially periodic structure having a period p related to the coherence length of a desired three-wave interaction process for a beam of optical wave energy propagating along the optical axis 53 of the optical waveguide 47.

The periodic electrode 52 produces a corresponding spatially periodic bias electric field across the quantum well layer 15 of the waveguide layer 47. When the period p of the spatially periodic bias field is equal to an odd integer number of the coherence length of the desired three-wave interaction, the conditions for quasiphasematched operation is obtained whereby the conversion efficiency of the three-wave interaction process is enhanced. Quasiphasematched operation in poled media is disclosed in an article entitled: "current induced periodic ferroelectric domain structures in LiNbO$_3$ applied for efficient nonlinear optical frequency mixing", appearing in Applied Physics Letters Vol. 47, No. 11 of 1 Dec. 1985, pgs. 1125–1127.

The waveguide 47 with quasiphasematched operation is useful for harmonic generation by directing the fundamental optical wave energy of $\lambda_1$ through a focusing lens 54 axially into the waveguide layer 47. The conversion efficiency of the interaction is enhanced by the quasiphasematched operation and the efficiency is further enhanced by the optical waveguide 47 which reduces diffraction effects.

The ends of the waveguide 47 may be cleaved and optically coated to provide mirrors M$_1$ and M$_2$ of an optical resonator optically coupled to one of the waves of the three-wave interaction process to further enhance conversion efficiency. M$_2$ is preferably coated to provide coupling of output wave energy from the resonator as output beam 55.

In alternative embodiments of the three-wave interaction, such as sum or difference frequency operation, a second input beam of wavelength $\lambda_2$ is fed into the quasiphasematched waveguide 47 via a beam-splitting mirror 56. In these sum and difference three-wave interactions, $(\omega_1 + \omega_2) = \omega_0$ or $(\omega_1 - \omega_2) = \omega_0$, where $\omega_0$ is the output frequency.

In the case of parametric three-wave oscillation or amplification, $\omega_1$ is an optical pump frequency, $\omega_2$ is the signal frequency and $\omega_i$ is an idler frequency. These three-wave parametric interactions are characterized by $\omega_1 = \omega_2 + \omega_i$.

Other suitable quantum well systems include III-V ternary solid solutions such as those listed in Table 5.3-1, Pg. 16, Part B of a text titled: "Heterostructure Lasers", published by Academic Press Inc., Orlando, Fla. (1978). Also, quaternary III-V systems such as those listed in Table 5.5-1 in the same text at page 33 are useful. In addition, binary III-V systems are useful such as those listed in Table 5.2-1, page 8, of the aforementioned text.

The advantages of the present invention include:

1. The ability to electronically switch the quasiphasematching condition by addressing the biasing electrodes, in order to, for example, tune a parametric oscillator.

2. The periodic bias field spacing and amplitude is variable along the device to optimally extract energy in processes with large conversion efficiencies.

3. The three-wave interactions take place in waveguides, which enhances the efficiency of the interaction by eliminating diffraction effects.

4. The electric field bias is applicable to any second order nonlinear optical interaction, e.g. second harmonic generation, frequency summing and differencing, parametric amplification and oscillation, and travelling wave electrooptic amplitude and phase modulation.

What is claimed is:

1. In a method for producing second order, three-wave radiation interaction, the steps of:
   providing a quantum well material which is substantially optically transparent to said radiation and includes free carriers within the same;
   applying an electric field to said quantum well material to produce a quadratic nonlinear optical susceptibility whose sign depends on the direction of the applied electric field; and
   introducing radiation for said second order interaction into that portion of said quantum well material having said quadratic nonlinear optical susceptibility.
   means for introducing optical wave energy into said one portion for optical interaction with said quantum well material; and
   means for producing a quadratic nonlinear optical susceptibility in said one portion of said quantum well material for said optical wave energy by applying an electric bias field across said one portion of said material, the sign of said susceptibility depending on the direction of the applied electric bias field.

2. The method of claim 1 including the step of:
   spatially varying the intensity of the electric field applied to the quantum well material to produce a spatial variation in the quadratic nonlinear optical susceptibility.

3. The method of claim 2 wherein the step of spatially varying the bias electric field applied to the quantum well material includes dimensioning a period of the spatial variation in the applied electric field to be generally equal to an odd integer number of coherence lengths parallel to the direction of optical wave propagation in the quantum well material.

4. The method of claim 3 including the step of:
   sandwiching a layer of quantum well material between materials having indices of refraction which are less than the index of refraction of the quantum well material for defining an optical waveguide containing the layer of quantum well material for guiding the optical waves within the layer of quantum well material and for enhancing the efficiency of the phasematched optical wave interaction.

5. The method of claim 4 including the step of locating the layer of quantum well material in an optical resonator for resonating one of the optical waves of the optical wave interaction within the quantum well material.

6. The method of claim 2 wherein the step of spatially varying the electric field applied to quantum well material includes the step of disposing a spatially periodic electric structure proximate quantum well material and applying an electrical potential to the periodic electrode structure to apply the spatially periodic electric field to the quantum well material.

7. In a quantum well apparatus of the type having at least one portion of substantially optically transparent quantum well material having free carriers within the same, sandwiched between barrier portions of material:

8. The quantum well apparatus of claim 7 including:
   means for spatially varying the intensity of the bias electric field applied to the portion of quantum well material for producing a spatial variation in the quadratic nonlinear optical susceptibility of the portion of quantum well material for quasi-phasematching optical wave interactions in the quantum well material associated with said optical wave energy.

9. The quantum well apparatus of claim 8 wherein said means for spatially periodically varying the intensity of the bias electric field is dimensioned for producing a period of the spatial variations in the applied bias field which is generally equal to an odd integer number of coherence lengths parallel to the direction of the propagation of said optical wave energy in the portion of quantum well material.

10. The quantum well apparatus of claim 7 including:
    optical waveguide means for sandwiching said portion of quantum well material between materials having indices of refraction which are less than the index of refraction of the quantum well portion for defining an optical waveguide containing the portion of quantum well material for guiding propagation of said optical wave energy within the portion of quantum well material.

11. The quantum well appartus of claim 7 including:
    optical resonator means for resonating the optical wave energy propagating within the portion of quantum well material.

* * * * *